United States Patent [19]

Manenti et al.

[11] Patent Number: 4,782,641
[45] Date of Patent: Nov. 8, 1988

[54] SCISSORS TRUSS CONNECTOR PLATES

[75] Inventors: Thomas J. Manenti, Coral Springs, Fla.; Marc Olden, Arlington, Tex.; John C. Fitzgerald, Sunrise, Fla.

[73] Assignee: MiTek Industries, Inc., St. Louis, Mo.

[21] Appl. No.: 2,353

[22] Filed: Jan. 12, 1987

[51] Int. Cl.[4] .............................................. E04B 1/32
[52] U.S. Cl. ........................................ 52/639; 52/642
[58] Field of Search ................. 52/639, 642, 643, 691; 428/132, 133; 29/412, 415; 411/457, 458, 459, 460, 461, 462, 463, 466

[56] References Cited

U.S. PATENT DOCUMENTS

| Re. 31,234 | 5/1983 | Jureit et al. | |
|---|---|---|---|
| 2,827,676 | 3/1958 | Sanford | |
| 2,877,520 | 3/1959 | Sureit | 52/543 |
| 2,937,418 | 5/1960 | Sanford | 52/639 X |
| 3,031,727 | 5/1962 | Nesbitt | 52/639 X |
| 3,070,923 | 1/1963 | Fellman | 52/639 |
| 3,281,168 | 10/1966 | Dufficy | |
| 3,312,485 | 4/1967 | Koenigshof | 52/639 X |
| 4,274,241 | 6/1981 | Lindal | |
| 4,317,316 | 3/1982 | Atwood et al. | |
| 4,483,117 | 11/1984 | Underhill et al. | |

FOREIGN PATENT DOCUMENTS

1067754  6/1954  France ................................. 52/642

*Primary Examiner*—Carl D. Friedman
*Assistant Examiner*—Creighton Smith
*Attorney, Agent, or Firm*—Senniger, Powers, Leavitt and Roedel

[57] ABSTRACT

A scissors truss comprises elongated structural wooden members establishing pairs of top chords and bottom chords connected at opposite ends thereof to establish a top apex joint, a bottom apex joint and heel joints at opposite ends of the truss. At least one vertical wooden member extends between the top and bottom joints to provide structural reinforcement. While the heel joints may be formed with conventional rectangular connector plates with struck teeth embedded into side faces of the chord members, the nail plate establishing the top apex joint is formed with upper inclined edges approximating the pitch of the top chords without projecting upwardly above an upper edge surface of the top chords. Similarly, the bottom nail plate establishing the bottom apex joint is formed with lower inclined edges approximating the pitch of the bottom chords without projecting downwardly below a lower edge surface of the bottom chords. An associated pair of top and bottom nail plates are preferably formed from a single rectangular nail plate with cut lines establishing the upper and lower inclined edges advantageously formed at a novel angle permitting usage of the top and bottom plates in a wide variety of types and dimensions of scissors trusses conforming to state and local code requirements. A method of manufacturing the top and bottom nail plates is also disclosed.

32 Claims, 4 Drawing Sheets

SCISSORS TRUSS CONNECTOR PLATES

TECHNICAL FIELD

The present invention relates generally to metal connector plates used in the assembl of refabricated wooden truss components. More particularly, the invention relates to metal connector nail plates for connecting top chords to each other and bottom chords to each other in a scissors truss used in the fabrication of mobile homes.

BACKGROUND ART

A scissors truss is a commonly used component in the manufacture of mobile homes wherein a series of such trusses are spaced from each other and conventionally connected to form a roof. A scissors truss of a type to which the present invention is concerned comprises a pair of inclined top chord members connected to a pair of inclined bottom chord members with generally vertical and inclined strut members extending therebetween. The top and bottom chords and the strut members are all preferably made from standard wood two-by-fours (2×4s) connected together in one plane. More specifically, adjacent inwardly directed upper ends of the top chords are connected together with rectangular metal connecting plates to form a top apex joint. Adjacent inwardly directed upper ends of the bottom chords, spaced vertically below the top apex joint, are also connected together with rectangular metal connecting plates to form a lower apex joint. One or more center vertical strut members connect the upper and lower apex joints together. Outwardly directed ends of associated top and bottom chords (i.e., located on one side of the center struts) connect together with rectangular metal plates to define heel joints. The vertical members extend from intermediate portions of the top chords to connect via rectangular plates to intermediate portions of the bottom chords. Inclined strut members may also extend from joints formed with the top chords to the base of the central vertical member or members forming the lower apex joint with the bottom chords.

The metal rectangular connector plates are each provided with a multiplicity of closely spaced teeth or projections punched out of the sheet metal which may be 18 gauge sheet steel, galvanized if desired. The projections are preferably generally triangular and are struck out substantially at right angles to plane of the plate so that they readily penetrate the fibers of the top and bottom chords when pressure is applied normal to the outer surface of the plate. Each projection forms a substantially rectangular slot in the plate and the size of the projections and their density per square inch of plate may be configured and arranged in the plate similarly as the teeth of the connector plates in, for example, U.S. Pat. No. 2,877,520 of common assignee herewith. The teeth are distributed over the major portion of the areas of the plate and these teeth provide structural securement for the ends of the chord members when embedded therein to form the top and bottom apex joints and the other joints discussed supra.

With a scissors truss utilized as a prefabricated roof truss in the manner described above, it is important that the standard connector metal plates described supra remain elevationally below the upper edge surfaces of the top chords to which upper edge surfaces roofing material will be flushly secured. Similarly, it is important that the rectangular truss connector plates remain elevationally above the lower edge surfaces of the bottom chords against which lower edge surfaces ceiling material (e.g., acoustical tile) will be flushly secured during final assembly of the mobile home. Because these edge surfaces are inclined with respect to the horizontal, the conventional rectangular layout of the standard truss connector plates do not permit a sufficient number of teeth to become embedded in the chords. Thus, the top and bottom apex joints may not have sufficient strength to conform to local code requirements unless these joints are strengthened either with reinforcement lumber and/or additional connector plates. Alternately, or in conjunction therewith, it is possible to mitre the ends of the chords forming the top and bottom apex joints for improved joint efficiency. However, whether the joints are strengthened either with mitred ends, reinforcement lumber and/or additional conventional rectangular connector plates, there results an inefficient use of lumber and/or labor, unnecessarily increasing the cost of the prefabricated scissors truss.

It is accordingly one object of the present invention to provide a scissors truss having top and bottom apex joints of a type employing novel forms of connector plates with struck teeth wherein the number of teeth embedded in the chords in the area of the joint are sufficient to provide improved joint efficiency vis-a-vis conventional rectangular connector plates with struck teeth.

It is another object of the present invention to provide a joint in a scissors truss of the type employing a novel form of connector plates with struck teeth which connector plates in the top and bottom apex joints are capable of carrying structural loading in final assembly of the scissors truss in single or double mobile homes.

Still another object of the present invention is to provide a novel form of connector plate for use in fabricating top and bottom apex joints of a prefabricated scissors truss and which novel form of connector plate may be universally used with different sizes of scissors trusses wherein truss size is dictated in accordance with varying state and local road height and width clearance limitations.

Yet a further object of the present invention is to provide a method of manufacturing a novel form of connector plate for use in fabrication of top and bottom apex joints within a scissors truss.

These and further objects and advantages of the present invention will become more apparent upon reference to the following specification, appended claims and drawings.

SUMMARY OF THE INVENTION

According to the present invention, there is provided a novel and unique metal connector plate for connecting together elongated structural wooden members comprising a scissors truss. The wooden members establish a pair of top chords and a pair of bottom chords wherein upper ends of the top chords and upper ends of the bottom chords are connected together with the novel connecting plates for defining a top apex joint and a bottom apex joint, respectively, with opposite ends of at least one elongated wooden member extending between the top and bottom apex joints. The novel connector plates are in the form of a top nail plate and a bottom nail plate respectively formimg the top and bottom joints, each top and bottom plate including a sheet metal, generally planar plate having a plurality of teeth struck therefrom for embedment into side faces of the chords and the elongate wooden member. The top nail plate includes upper inclined edges approximating the pitch of the top chords without projecting upwardly above an upper edge surface of the top chords. The bottom nail plate has lower inclined edges approximating the pitch of the bottom chords without projecting downwardly below a lower edge surface of the bottom chords. The configuration of the top and bottom nail plates thus increases the number of teeth which become embedded in the chords and the elongated wooden member forming the top and bottom apex joints for improved joint efficiency.

It is a preferred feature of the present invention to form the top and bottom nail plates from a generally rectangular commercially available nail plate by cutting the latter, along cut lines, into the top and bottom nail plates. These cut lines are made in the direction of the longitudinal axis of the rectangular plate and occur as oppositely inclined lines that meet at an apex point preferably along an axis that is transverse to the longitudinal axis and which bisects the rectangular plate. Each oppositely inclined cut line forms a generally constant predetermined angle with reference to the longitudinal axis of the plate. By extensive experimentation, this predetermined angle is preferably on the order of about 9°±2°. This enables the resulting top and bottom plates cut from the same rectangular plate to be more or less universally applied in various sizes of scissors trusses that may differ in nationwide use as a result of different state and local road height and width limitations.

In commercial practice, it has been found that top and bottom nail plates having the novel form described above with inclined edges at said predetermined angle are capable of being employed in scissors trusses having truss spans of approximately 169 inches to 181 inches; an overall rise measured from the heel joints to the top apex of approximately 24 to 30 inches and a truss depth measured between the top and bottom apexes of approximately 12 inches. The top and bottom inclined nail plates in accordance with the invention may be advantageously utilized with a scissors truss configuration preferably within the foregoing range of size without projecting beyond the upper and lower edge surfaces of the chords and while preferably and substantially optimizing the number of teeth embedded in the chords at the top and bottom apexes.

A method of manufacturing the aforesaid novel metal connector plates is also disclosed. In accordance with the manufacturing method according to the present invention, a ribbon of sheet metal of predetermined gauge and width is provided with a plurality of teeth struck therefrom in a major area of the plate so as to extend substantially at right angles to the plane of the sheet metal. The ribbon of sheet metal having the struck out teeth is then cut into predetermined lengths to form generally rectangular plates each having substantially parallel longitudinal edges and substantially parallel transverse edges extending generally orthogonal to the longitudinal edges. Next, the rectangular plate is cut or preferably stamped along the cut lines into the pair of plates having oppositely inclined edges forming the top and bottom connector plates of the invention.

By experimentation, it has been determined that the number of teeth embedded into the chords and wooden reinforcement member within the top and bottom apex joints is preferably optimized by locating the cut lines such that they intersect the sides or transverse edges of the rectangular plate with the result that approximately 55-60% (preferably 58%) of the length of the rectangular plate side edges forms the side edges of the bottom plate with the remaining 40-45% (preferably 42%) of the rectangular side edges forming the side edges of the top plate. It has also been found advantageous for the cut lines to terminate within the rectangular plate at a point defining the apexes of the top and bottom plates such that the straight line distance between the point and the longitudinal edge of the rectangular plate corresponding to the bottom edge of the top plate is approximately 50-55% of the overall width of the rectangular plate and preferably 53% of the overall width.

The foregoing top and bottom plate configurations and dimensions may be utilized in commercial practice with 18 gauge plate having nominal dimensions of 6×9 inches with the longer dimension defining the top or bottom edge of the plates. The slots formed within the plates are preferably generally parallel to the longitudinal top and bottom edges of the bottom and top apex plates, respectively, particularly when the method according to the present invention is practiced. However, these slots may extend vertically in relation to the longitudinal edges of said top and bottom plates.

BEST MODE FOR CARRYING OUT THE INVENTION

Figure 1:
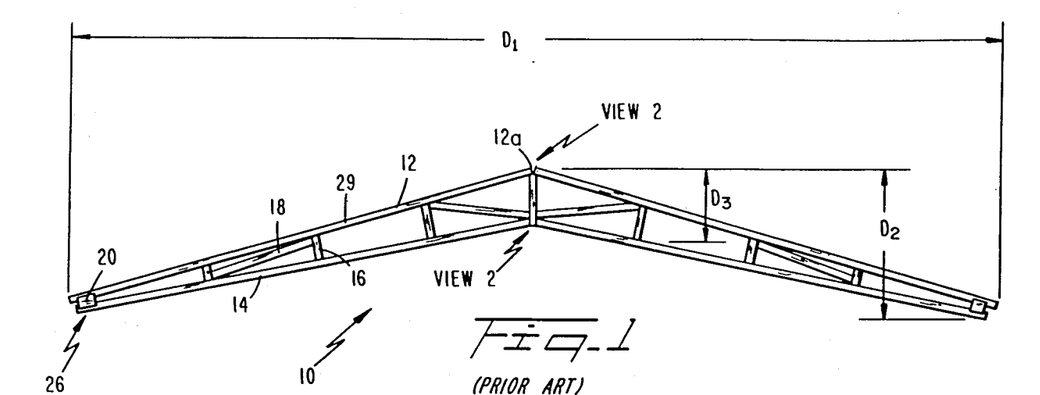
FIG. 1 is a plan view of a scissors truss of the type in which the present invention is utilized in which conventional prior art rectangular nail plates are employed for securing the various wooden structural members together.

Reference is now made to the drawings, particularly FIG. 1, wherein there is illustrated a scissors truss 10 of a type in which the present invention may be utilized. In accordance with conventional formation of prefabricated scissors trusses, as shown in FIG. 1, scissors truss 10 comprises a pair of inclined top chord members 12 connected to a pair of inclined bottom chord members 14 with generally vertical and inclined wooden strut reinforcement members 16 and 18, respectively. The top and bottom chords 12,14 and the strut members 16,18 are all preferably made from standard wood two-by-fours (2×4s) connected together in one plane. More specifically, adjacent inwardly directed upper ends 12a of top chords 12 are connected together with rectangular metal connecting plates 20 to form a top apex joint 22. Adjacent inwardly directed upper ends 14a of bottom chords 14, spaced vertically below the top apex joint 22, are also connected together with rectangular metal connecting plates 20 to form a lower apex joint 24. A central vertical strut member 16' connects the upper and lower apex joint 22,24 together. However, other arrangements of central vertical strut member 16' may be utilized with the present invention, such as the arrangement of reinforcement strut members depicted in FIG. 4.

Outwardly directed ends of associated top and bottom chords 12,14 (i.e., located on one side of the strut 16') connect together with rectangular metal connector plates 20 to define heel joints 26. The vertical members 16 extend from intermediate portions of the top chords 12 to connect via rectangular plates 20 to intermediate portions of the bottom chords 14. Inclined strut members 18 may extend from joints formed with the top chords 12 to the base of the central vertical member 16' forming the lower apex joint 24. The arrangement of vertical and inclined reinforcement members depicted in FIG. 1 is merely exemplary in nature and other arrangements of reinforcement members forming part of the scissors truss are contemplated within the scope of the present invention.

It is desired that the truss dimensions be maintained within particular ranges so that the overall height and width of the mobile home and transport vehicle are in accordance with permissible governmental (e.g. state) road height and width restrictions. Thus, in a scissors truss 10 of the above type, heel joints 26 are spaced from each other by a distance $D_1$ defining the truss span. This truss span $D_1$ defines the overall width of the single wide mobile home which is typically in the range of 159 inches to 181 inches. The vertical distance $D_2$ between heel joints 26 and top apex joint 22 which defines the overall rise of scissors truss 10 is generally in the range of 24 to 30 inches. The distance $D_3$ between top and bottom apex joints 22,24 which defines the truss depth is typically 12 inches.

The metal connector plates 20 are each provided with a multiplicity of closely spaced teeth or projections 21 (see, e.g., FIG. 5) punched out of the metal which may be 18 gauge sheet steel galvanized if desired. Such rectangular plates 20 are commercially available and sold, for example, by the common assignee herewith as GN-80 nail plates. The projections 21 are preferably generally triangular and are struck out substantially at right angles to the plane of the plate so that they readily penetrate the fibers of the top and bottom chords 12,14 when pressure is applied normal to the outer surface of the plate. Each projection 21 forms a substantially rectangular slot 21a in the plate and the size of the projections and their density per square inch of plate may be configured and arranged in the plates similarly as the teeth of the connector plates in U.S. Pat. No. 2,877,520 or U.S. Pat. No. Re. 31,234, for example.

Figure 2:
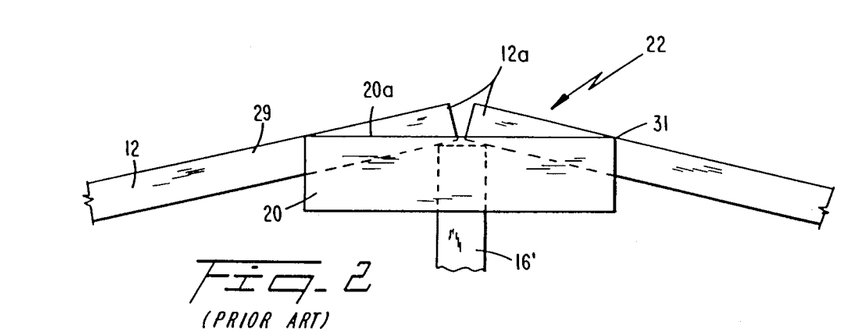
FIG. 2 is a detailed view of a conventional top apex joint of the scissors truss of FIG. 1.
Figure 3:
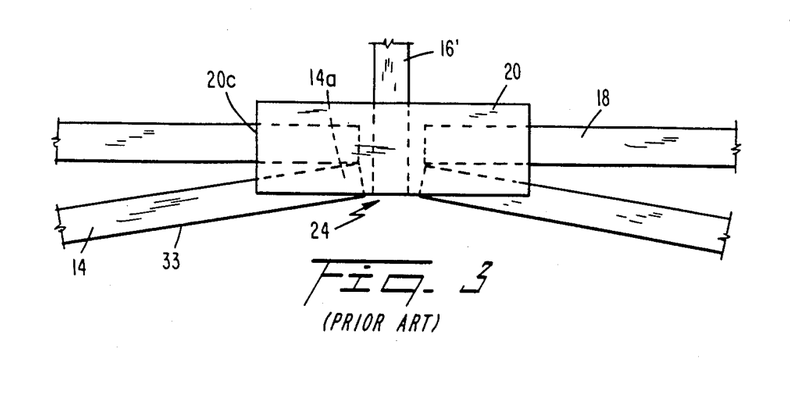
FIG. 3 is a detailed view of a conventional bottom apex joint of the scissors truss of FIG. 1.

FIGS. 2 and 3 are detailed illustrations of conventional rectangular metal plates 20 respectively provided at top and bottom apex joints 22,24 to assist in structurally connecting the various chord and strut members together. In the construction of the aforesaid top and bottom apex joints 22,24, as illustrated, it is important that the upper edge 20a of the top rectangular plate 20 does not protrude above the upper edge surface 29 of the top chords 12 since these upper edge surfaces define a structural support surface to which roofing materials may be directly secured. Thus, the length of the rectangular plate 20 and, in particular, the upper corners 31 of the rectangular plate limit the number of teeth that may be embedded in the faces of the chords proximate the apex joint 22. In the case of top apex joint 22, for example, there is a large area defined between (1) the upper edge surface 20a of plate 20 and (2) below the upper edge surfaces 29 of the top chords 12 and (3) between the upper corners 31 of the plate in alignment with the chord upper surfaces in which metal teeth 21 are not embedded; this results in a weakened joint. Similarly, with reference to FIG. 3 and lower apex joint 24, it is desirable that the lower edge 20b of the bottom plate 20 does not protrude elevationally below the bottom edge surface 33 of the bottom chords 14 to which bottom edge surface ceiling materials may be directly secured. Thus, with conventional rectangular metal plates 20, a portion of the faces of the bottom chords 14 located (1) above the bottom edge surfaces 33 of these chords, (2) below the bottom edge 20b of the plate 20 and (3) within an area located between the vertical edges 20c of the bottom plate does not contain teeth 21. with the use of conventional rectangular metal plates 20, therefore, the aforesaid upper and lower areas of FIGS. 2 and 3 are not embedded with metal teeth 21, lowering joint efficiency and requiring various prior art reinforcement measures discussed supra.

Figure 4:
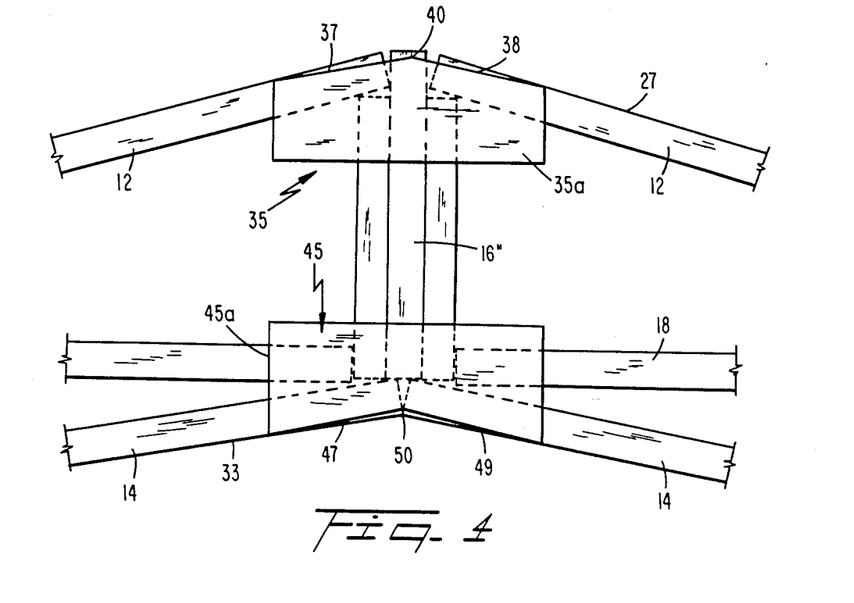
FIG. 4 is a plan view of a top and a bottom metal connector apex plate in accordance with the present invention.
Figure 5:
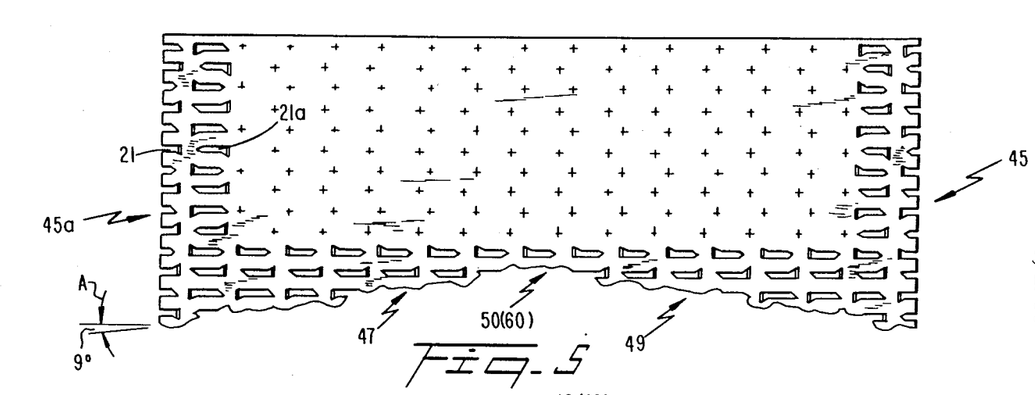
FIG. 5 is an actual size, scaled plan view of a bottom metal connector apex plate manufactured in accordance with the present invention.
Figure 6:
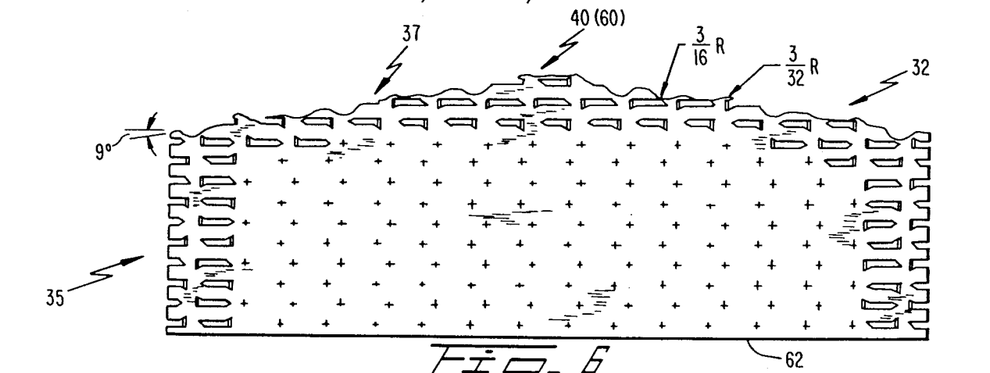
FIG. 6 is a scaled plan view, in actual size, of a top apex metal connector plate manufactured in accordance with the present invention.

Referring now to FIGS. 4-6 of the drawing, top and bottom apex plates in accordance with the present invention are illustrated wherein top apex plate 35 has a generally rectangular configuration except that its upper edge is defined by a pair of oppositely inclined edges 37 and 38 terminating in a peak 40 in approximately the center of the upper edge. This arrangement essentially provides a triangular shaped upper portion within the top apex plate 35 containing teeth 21 within said upper triangular portion which become embedded within side faces of the chord members 12 during fabrication of the scissors truss 10. Thus, advantageously, the embedded teeth 21 increase joint efficiency by substantially increasing the number of teeth penetrating the wood fibers of the chord and strut members 12,16' in the immediate area of the joint in comparison with the prior art rectangular metal connector plates 20 depicted in FIGS. 1-3 of the drawing as discussed in detail above.

The bottom apex connector plate 45 of the invention is generally rectangular except that its lower edge is defined by a pair of oppositely inclined edges 47 and 49 inclined in the direction of the center of the apex plate and which terminate in an apex 50. These lower inclined edges 47,49 of the bottom plate 45 preferably correspond to the pitch of the bottom edge surfaces 33 of the bottom 14 chords so as to optimize the number of metal teeth 21 that become embedded within the wooden chords proximate the bottom joint 24. Likewise, the upper inclined edges 37,38 of the top apex plate 35 preferably correspond to the pitch of the upper edge surface 29 of the top chords 12 for improved joint efficiency.

While the fabrication of the aforesaid top and bottom apex plates 35,45 according to the present invention may occur in a variety of different ways as will now occur to those skilled in the art based upon the foregoing description, reference is now made to a preferred embodiment of the invention and, in particular, a method of manufacturing the preferred embodiment. With reference to FIGS. 5 and 6, there are respectively illustrated a bottom apex plate 45 and a top apex plate 35 which are both cut from the same rectangular metal plate such as GN-80 nail plates manufactured by the common assignee herein. In other words, it is a novel and preferred feature of the present invention to form the top and bottom apex plates of the invention from the same piece of rectangular connector plate material as aforesaid which typically has nominal dimensions of 6 inches by 9 inches and is constructed from 18 gauge stock material. FIGS. 5 and 6 are thus actual sized scaled plan views of the bottom and top apex plates, respectively, constructed in accordance with the present invention from a rectangular plate of GN-80 (18 gauge) nail plate which may, for example, be cut into the FIG. 5 and FIG. 6 shapes utilizing a secondary die process following the initial formation of the GN-80 rectangular plate material.

Since it is a preferred feature of the present invention to form a pair of top and bottom apex plates 35,45 from the same rectangular stock material, it is necessary to select an appropriate pair of cut lines along which the rectangular nail plate will be cut to form the oppositely inclined edges of the top and bottom apex plates discussed supra. In consideration of the pitch of the top chord members 12 which tends to be greater than the bottom chord members 14 due to the inherent shape of the scissors truss 10, and in further consideration of the size variations (i.e. truss span $D_1$, truss depth $D_2$ and overall rise $D_3$), it has been determined by extensive experimentation and testing that a preferred predetermined angle A along which the cut lines are cut to establish the apex plates is preferably about $9° \pm 2°$ so as to optimize the number of teeth provided in each of the top and bottom apex joints 22,24 without resulting in corner portions of either apex plate protruding either above the upper edge surface 29 of the top chord members (in the case of the top plate) or below the lower surface 33 of the bottom chord members (in the case of the bottom plate) as illustrated in FIG. 4.

By experimentation, it has also been determined that the number of teeth embedded into the chords and wooden reinforcement members within the top and bottom apex joints is preferably optimized by locating the cut lines such that they intersect the side or transverse edges of the rectangular plate with the result that approximately 55-60% (preferably 58%) of the length of the rectangular plate side edges forms the side edges 45a of the bottom plate 45 with the remaining 40-45% (preferably 42%) of the rectangular side edges forming the side edges 35a of the top plate 35. It has also been found advantageous for the cut lines to terminate within the rectangular plate at a point 60 defining the apexes of the top and bottom plates 35,45 such that the straight line distance between the point 60 and the longitudinal edge 62 of the rectangular plate edge corresponding to the bottom edge of the top plate 35 (see FIG. 6) is approximately 50-55% of the overall width of the rectangular plate and more particularly 53% of the overall width. The foregoing considerations tend to optimize overall joint efficiency in the top and bottom apex joints 22,24 by strategic placement of a large number of teeth in the vicinity of both the top and bottom joints.

Figure 7:
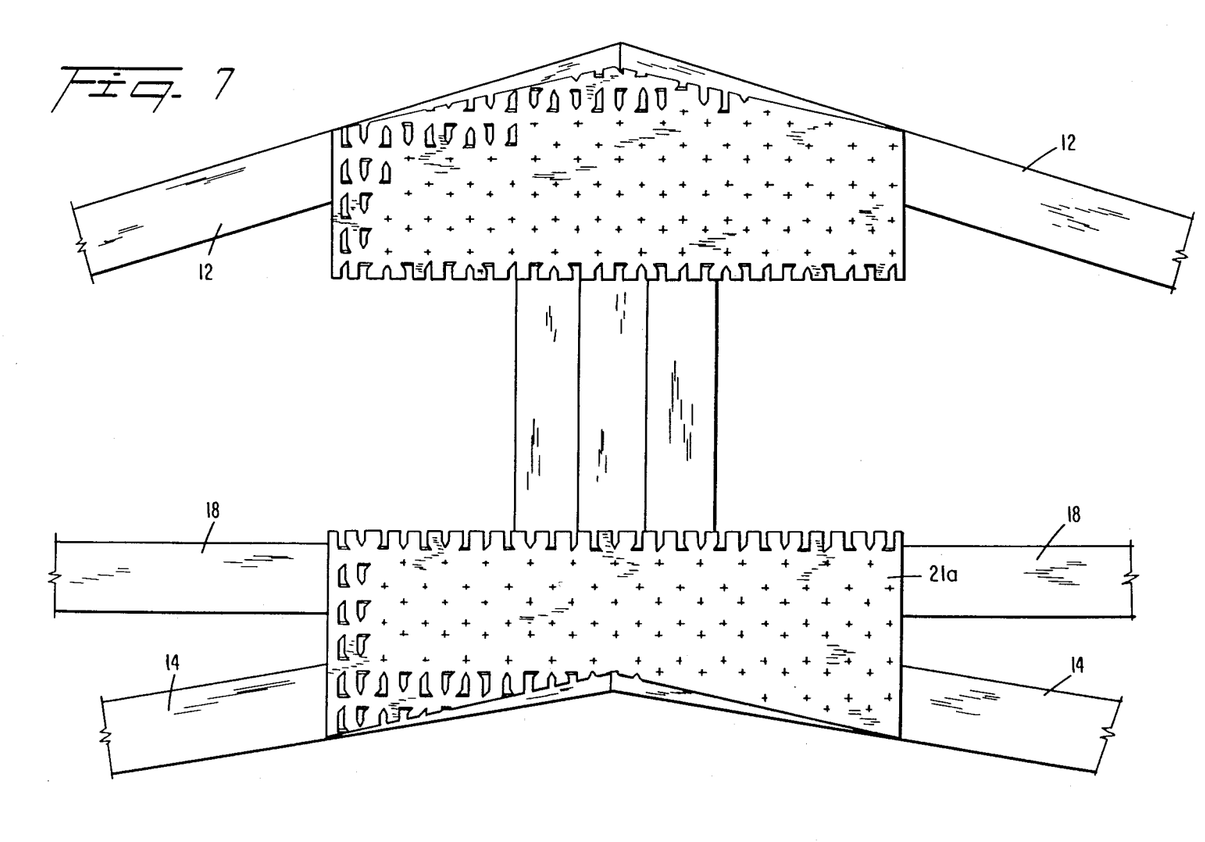
FIG. 7 is an actual size, scaled plan view of an alternate form of plate manufactured in accordance with the present invention.

In accordance with a preferred method of manufacturing the present invention as depicted in FIGS. 4-6, it will be appreciated that the slots 21a in each of the top and bottom apex plates are oriented generally horizontally within the resulting scissors truss 10 with the nominal 9 inch dimension of the apex connecting plates 35,45 being generally parallel to the longitudinal axis of the truss. However, it is also within the scope of the present invention to form the top and bottom apex plates in the manner depicted in FIG. 7 wherein the slots 21a are oriented vertically within the scissors truss 10 with the nominal 6 inch dimension essentially being parallel to the longitudinal axis of the truss.

It is of course within the scope of the present invention to vary the foregoing dimensional relationships including the gauge of the sheet metal material forming the top and bottom apex connecting plates 35,45. However, based upon experimentation, it has been found that 18 gauge sheet metal nail plate material is particularly advantageous when the joints of the scissors truss 10 are formed by chord members 12,14 having square cut ends as depicted, for example, in FIGS. 2, 3 and 4. with this type of chord stock material, it has been found that 20 gauge sheet metal is usually insufficient for fabrication of scissors trusses with the apex plates according to the present invention unless additional reinforcement materials are utilized. However, it has also been found that 20 gauge sheet metal material provides satisfactory performance if the ends of the chord members are mitre cut.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A scissors truss comprising a plurality of elongate structural wooden members establishing a pair of top chords and a pair of bottom chords, upper ends of said top chords and upper ends of said bottom chords being connected together to define a top apex joint and a bottom apex joint, respectively, lower ends of the top chords being connected to lower ends of the bottom chords to define a pair of heel joints, an elongate wooden member extending between the top and bottom apex joints with upper and lower ends of said elongated wooden member respectively forming a part of said apex joints, and means for structurally securing together (1) said upper end to establish the top apex joint and (2) said lower ends to establish the bottom apex joint, said securing means being a top nail plate and a bottom nail plate respectively forming the top and bottom joints, each nail plate in the form of a sheet metal generally planar plate having a plurality of teeth struck therefrom for embedment into side faces of said chords and said wooden member, the top nail plate having upper inclined edges approximating the pitch of upper edge surfaces of the top chords without projecting upwardly above said upper edge surfaces of the chords, the bottom nail plate having lower inclined edges approximating the pitch of lower edge surfaces of the bottom chords and extending generally coextensive therewith without projecting downwardly below said lower edge surfaces of the bottom chords, said top and bottom nail plates being dimensioned in relation to each other such that interfitting of the upper inclined edges of the top nail plate with the lower inclined edges of the botom nail plate results in an overall plate structure of rectangular configuration in plan view.

2. The scissors truss of claim 1, wherein said bottom and top nail plates are formed by die cutting a generally rectangular nail plate into two sections being the top and bottom nail plates.

3. The scissors truss of claim 2, wherein said top nail plate has a pair of generally paralle side edges and a bottom edge extending between lower ends of the side edges, said upper inclined edges terminating in an apex and wherein each said upper inclined edge forms a generally constant predetermined angle A with reference to an imaginary line extending generally perpendicular to the side edges.

4. The truss of claim 3, wherein said bottom plate has a pair of generally parallel side edges and a top edge extending between upper ends of said side edges, said lower inclined edges terminating in an apex, each said lower inclined edge forming a generally constant predetermined angle A with reference to an imaginary reference line extending generally perpendicular to said side edges.

5. The truss of claim 4, wherein said angle A is selected to be approximately 9°±2° for substantially universal application of said top and bottom nail plates in conjunction with a scissors truss having a truss span measured between said heel joints of approximately 159 to 181 inches, an overall rise being the straight line vertical distance between the heel joints and the top apex or approximately 24 to 30 inches and a truss depth measured between the top and bottom apex joints being approximately 12 inches.

6. The truss of claim 2 or 5, wherein cut lines through the rectangular nail plate forming said top and bottom nail plates intersect side edges of said rectangular plate extending generally perpendicular to the longitudinal axis of said rectangular plate such that approximately 55–65% of the length of said rectangular plate side edges forms the side edges of the bottom plate and the remaining 40–45% of the length of said rectangular plate side edges forms the side edges of the top plate.

7. The truss of claim 6, wherein approximately 58% of the length of the rectangular plate side edge forms the side edges of the bottom plate and the remaining approximately 42% of the rectangular plate side edge length forms the side edges of said top plate.

8. The truss of claim 2 or 7, wherein said cut lines forming the inclined edges of said top and bottom nail plates terminate within the rectangular plate at a point defining the top and bottom apexes such that the straight line distance between said point and the closest point lying on the longitudinal edge of said rectangular plate corresponding to the bottom edge of said top plate is approximately 50–55% of the overall width of the rectangular plate.

9. The truss of claim 8, wherein said straight line distance is 53% of the overall width of said rectangular plate.

10. The truss of claim 2 or 8, wherein said rectangular plate is 18 gauge sheet metal, said rectangular plate side edges are approximately 6 inches and said rectangular plate longitudinal edges are approximately 9 inches, the side edges of said top plate being about 2.5 inches and the side edges of the bottom plate being about 3.5 inches, the straight line distance between the top apex of the top plate and the bottom edge of said top plate being about 3.2 inches.

11. The truss of claim 10, wherein substantially each said tooth struck out from said plates leave a resulting slot within the plate that extends generally parallel to longitudinal edges of the plates and which slots are thereby horizontally arranged when the top and bottom plates are secured to said truss.

12. The truss of claim 1 or 2, wherein said struck out teeth each leave a resultant slot in the associated plate, said slots extending generally horizontally when the top and bottom plates are secured to the truss.

13. The truss of claim 1 or 2, wherein said struck out teeth each leave a resultant slot in the associated plate, said slots extending generally vertically when the top and bottom plates are secured to the truss.

14. The truss of claim 12, wherein said heel joints are each formed with generally rectangular nail plates.

15. The truss of claim 13, wherein said heel joints are formed with generally rectangular nail plates.

16. A method of manufacturing a pair of nail plates for use in a scissors truss having a plurality of elongated structural wooden members establishing a pair of top chords and a pair of bottom chords, upper ends of said top chords and upper ends of said bottom chords being connected together to define a top apex joint and a bottom apex joint, respectively, lower ends of the top chords being connected to lower ends of the bottom chords to define a pair of heel joints, an elongated wooden member extending between the top and bottom apex joints with upper and lower ends of said wooden member respectively forming a part of said apex joints, said top and bottom nail plates respectively providing structural securement of the upper ends of said members and the lower ends of said members to define said top and bottom apex joints, comprising the steps of:
(a) providing a ribbon of sheet metal of generally constant width with a plurality of teeth struck therefrom in rows staggered from each other throughout the generally flat surface of said sheet metal ribbon, each said struck out tooth leaving a slot in the sheet metal;
(b) cutting said ribbon into predetermined lengths to form rectangular plates; and
(c) cutting at least some of said rectangular plates such that said at least some of said rectangular plates each form a pair of said top and bottom plates, the cut rectangular plates each forming a pair of top and bottom plates being cut such that the top plate has upper inclined edges approximating the pitch of the top chords and the bottom plate has lower inclined edges approximating the pitch of the bottom chords.

17. The method of claim 16, wherein said top and bottom nail plates formed from one of said generally rectangular nail plates is formed by die-stamping said rectangular nail plate into two sections being the top and bottom nail plates, wherein said top plate has a pair of generally parallel side edges and a bottom edge extending between lower ends of said side edges, said upper inclined edges terminating in an apex with each said inclined edge forming a generally constant predetermined angle A with reference to the side edges of said rectangular nail plate.

18. The method of claim 17, wherein said bottom plate has a pair of generally parallel side edges and a top edge extending between upper ends of said side edges, said lower inclined edges of the bottom plate terminating in an apex with each inclined lower edge forming a generally constant predetermined angle A with reference to the longitudinal edge of the rectangular plate.

19. The method of claim 18, wherein said angle A is selected to be approximately 9°.

20. The method of claim 19, wherein the cut lines extending through each of said at least some rectangular plates intersects side edges of the rectangular plate extending perpendicular to the longitudinal axis of said plate such that approximately 55–60% of the length of said rectangular side edges forms the side edges of the bottom plate and the remaining 40–45% of the length of said rectangular plate side edges forms the side edges of the top plate.

21. The method of claim 20, wherein 58% of the length of said rectangular plate side edges forms the side edges of the bottom plate.

22. The method of claim 21, wherein said cut lines terminating within the rectangular plate terminate at a point defining said top and bottom apexes of the resulting top and bottom plates such that the straight line distance between said point and a longitudinal edge of the rectangular plate corresponding to the bottom edge of the top plate is approximately 50–55% of the overall width of said rectangular plate.

23. The method of claim 22, wherein said straight line distance is about 53% of the overall width.

24. The method of claim 23, wherein said rectangular plate is formed from 18 gauge sheet metal having dimensions of approximately 6 inches forming the side edges and 9 inches forming the longitudinal edges of said rectangular plate.

25. The method of claim 24, wherein said slots are generally parallel to the longitudinal edges of the rectangular plate and thereby horizontally arranged when said plates are secured to the truss at the top and bottom apexes.

26. In a scissors truss including a plurality of elongate structural wooden members establishing a pair of top chords and a pair of bottom chords, with upper ends of said top chords and upper ends of said bottom chords being connected together to define a top apex joint and a bottom apex joint, respectively, and with lower ends of the top chords being connected to the lower ends of the bottom chords to define a pair of heel joints, and an elongate wooden member extending between the top and bottom apex joints with upper and lower ends of said wooden member respectively forming a part of said apex joints, the improvement comprising a top nail plate and a bottom nail plate respectively forming the top and bottom joints each in the form of a sheet metal generally planar plate having a plurality of teeth struck therefrom for embedment into said side faces of said chords and said wooden member, the top nail plate having upper inclined edges approximating the pitch of the top chords without projecting upwardly above the upper edge surfaces of the top chords, the bottom nail plate having lower inclined edges approximating the pitch of the bottom chords without projecting downwardly below a lower edge surfaces of the bottom chords, said top and bottom nail plates being dimensioned in relation to each other such that interfitting of the upper inclined edges of the top nail plate with the lower inclined edges of the bottom nail plate results in an overall plate structure of rectangular configuration in plan view.

27. The scissors truss of claim 1 or 26, wherein upper ends of said top chords and said bottom chords are squared off.

28. The truss of claim 27, wherein said top and bottom plates are each formed with single teeth configurations.

29. A pair of nailing plates for a scissors truss of the type comprising a plurality of elongate structural wooden members establishing a pair of top chords and a pair of bottom chords, the upper ends of the top chords being connected together to form a top apex joint and the upper ends of the bottom chords being connected together to form a bottom apex joint, the included angle between the bottom chords being greater than the included angle between the top chords, the nailing plates comprising:
   a first plate having a pentagonal shape with it uppermost edges forming a peak adapted to overlie and connect the top chord members, and
   a second plate having a pentagonal shape with its lowermost edges forming a trough adapted to overlie and connect the bottom chord members,
   the nailing plates being formed from a single rectangular nailing plate, separated by a chevron-shaped die cut intermediate the top and bottom edges, the included angle of the chevron-shaped cut being greater than the included angle between the top chord members but less than the included angle between the bottom chord members.

30. A pair of nailing plates for a scissors truss of the type comprising a plurality of elongate structural wooden members establishing a pair of top chords and a pair of bottom chords, the upper ends of the top chords being connected together to form a top apex joint and the upper ends of the bottom chords being connected together to form a bottom apex joint, the included angle between the bottom chords being greater than the included angle between the top chords, the nailing plates comprising:
   a first plate having a pentagonal shape with it uppermost edges forming a peak adapted to substantially overlie the top chords without protruding above their upper edges to thereby connect the top chord members, and
   a second plate having a pentagonal shape with its lowermost edges forming a trough adapted to substantially overlie the bottom chords without protruding below their lower edges to thereby connect the bottom chord members,
   the first and second nailing plates being formed from a single rectangular sheet metal nailing plate of the type having a plurality of teeth struck therefrom for embedment into the chords, the rectangular nailing plate being divided by a chevron-shaped die cut intermediate the top and bottom edges, the included angle of the chevron-shaped cut being greater than the included angle between the top chord members but less than the included angle between the bottom chord members.

31. A scissors truss of the type comprising a plurality of elongate structural wooden members establishing a pair of top chords and a pair of bottom chords, the upper ends of the top chords being connected together to form a top apex joint and the upper ends of the bottom chords being connected together to form a bottom apex joint, the included angle between the bottom chords being greater than the included angle between the top chords, the scissors truss further comprising a pair of nailing plates comprising:
   a first plate having a pentagonal shape with it uppermost edges forming a peak adapted to substantially overlie the top apex joint without protruding above the upper edges of the top chord members to thereby connect the top chord members, and
   a second plate having a pentagonal shape with its lowermost edges forming a trough adapted to substantially overlie the bottom apex joint without protruding below the lower edges of the bottom chord members to thereby connect the bottom chord members, the first and second plates being formed from a single rectangular sheet metal nailing plate of the type having a plurality of teeth struck therefrom for embedment into the chords, the rectangular nailing plate being divided by a chevron-shaped die cut intermediate the top and bottom edges, the included angle of the chevron-shaped cut being greater than the included angle between the top chord members but less than the included angle between the bottom chord members.

32. A method of making a pair of nailing plates for a scissors truss of the type comprising a plurality of elongate structural wooden members establishing a pair of top chords and a pair of bottom chords, the upper ends of the top chords being connected together to form a top apex joint and the upper ends of the bottom chords being connected together to form a bottom apex joint, the included angle between the bottom chords being greater than the included angle between the top chords, the nailing plates comprising:

a first plate having a pentagonal shape with it uppermost edges forming a peak adapted to substantially overlie the top apex joint without protruding above the upper edges of the top chord members to thereby connect the top chord members, and a second plate having a pentagonal shape with its lowermost edges forming a trough adapted to substantially overlie the bottom apex joint without protruding below the lower edges of the bottom chord members to thereby connect the bottom chord members, the method comprising:

making a chevron-shaped die cut across a single rectangular sheet metal nailing plate of the type having a plurality of teeth struck therefrom for embedment into the chords, intermediate the top and bottom edges, the included angle of the chevron-shaped cut being greater than the included angle between the top chord members but less than the included angle between the bottom chord members.

* * * * *